United States Patent
Chu et al.

(10) Patent No.: US 10,182,399 B1
(45) Date of Patent: Jan. 15, 2019

(54) RECEIVE OPERATION MODE REPORTING AND SUBSEQUENT FRAME TRANSMISSION BASED ON TRANSITIONS BETWEEN POWER MANAGEMENT MODES

(71) Applicant: Marvell International Ltd., Hamilton (BM)

(72) Inventors: Liwen Chu, San Ramon, CA (US); Chor-Teck Law, Fremont, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/439,627

(22) Filed: Feb. 22, 2017

Related U.S. Application Data

(60) Provisional application No. 62/298,056, filed on Feb. 22, 2016.

(51) Int. Cl.
| | |
|---|---|
| *H04W 52/02* | (2009.01) |
| *H04W 72/04* | (2009.01) |
| *H04L 5/00* | (2006.01) |

(52) U.S. Cl.
CPC ....... *H04W 52/0229* (2013.01); *H04L 5/0055* (2013.01); *H04W 72/0446* (2013.01)

(58) Field of Classification Search
CPC .......... H04W 52/0229; H04W 72/0446; H04L 5/0055
See application file for complete search history.

(56) References Cited

U.S. PATENT DOCUMENTS

| | | | | |
|---|---|---|---|---|
| 2015/0173014 | A1* | 6/2015 | Lee ................... | H04W 52/0216 370/311 |
| 2016/0183186 | A1* | 6/2016 | Wong ................ | H04W 52/0216 370/311 |
| 2017/0078967 | A1* | 3/2017 | Asterjadhi ........ | H04W 52/0229 |

OTHER PUBLICATIONS

IEEE Std 802.11-2012, Part 11: Wireless LAN Medium Access Control (MAC) and Physical Layer (PHY) Specifications, Mar. 29, 2012.*

* cited by examiner

*Primary Examiner* — Kwang B Yao
*Assistant Examiner* — Moo Jeong

(57) ABSTRACT

Systems and techniques relating to wireless networking, namely employing power management (PM) indication mechanisms in addition to ROM indication mechanisms so as to support ROM related outage period enhancements, include: transmitting a first data frame, wherein a format of the first data frame comprises: (i) a field indicating a change in receive operation mode (ROM) settings, and (ii) a subfield having a value indicating a power management mode of the wireless device; receiving an acknowledgement frame to enable a power management mode associated with the subfield in the first frame, the acknowledgement frame having been transmitted by a second wireless device in response to receiving the first frame by the second wireless device, wherein the power management mode delays transmission of additional frames to the first wireless device until receiving a second data frame having a value indicating a change in the power management mode.

16 Claims, 5 Drawing Sheets

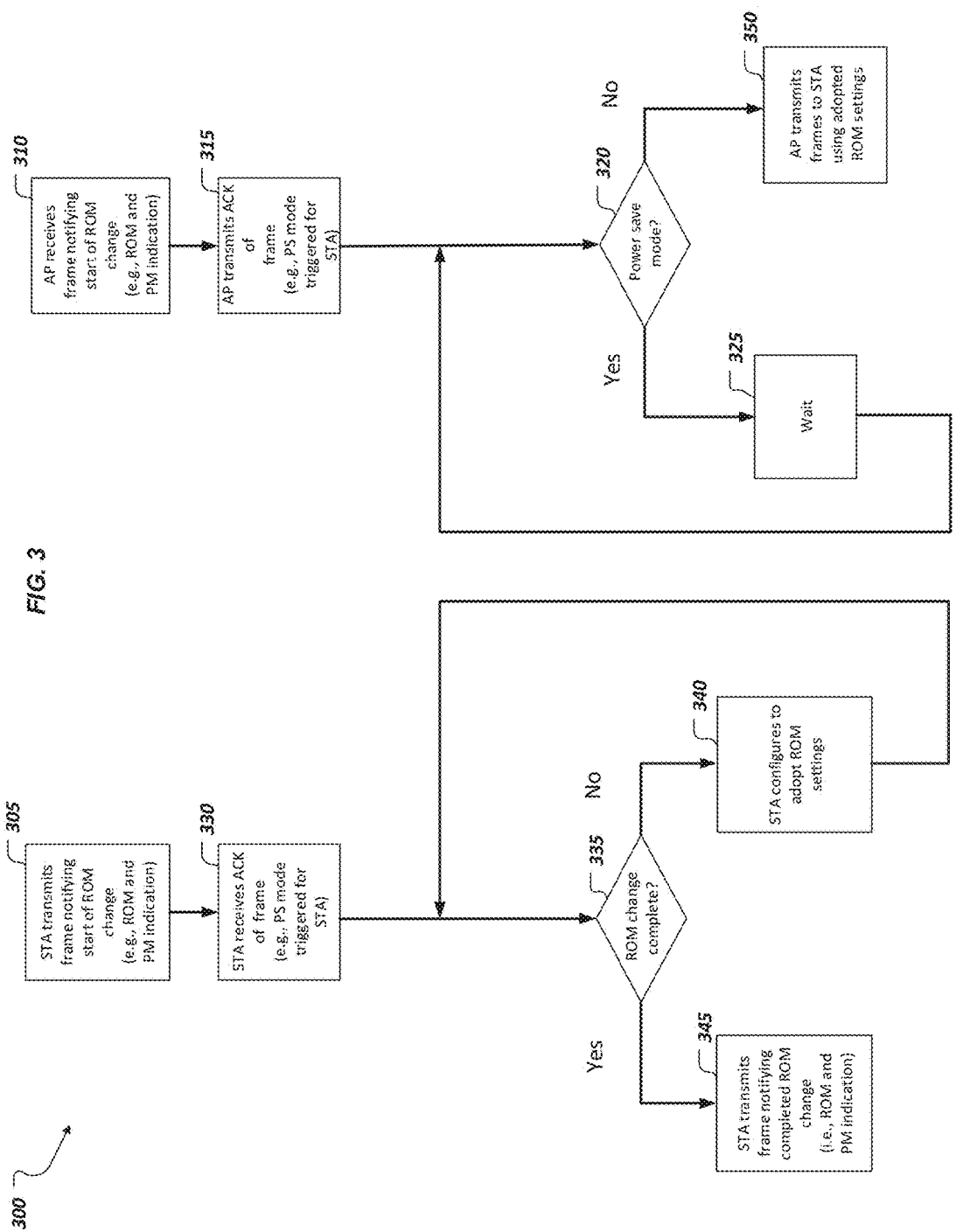

RECEIVE OPERATION MODE REPORTING AND SUBSEQUENT FRAME TRANSMISSION BASED ON TRANSITIONS BETWEEN POWER MANAGEMENT MODES

CROSS REFERENCE TO RELATED APPLICATION

This disclosure claims the benefit of the priority of U.S. Provisional Application Ser. No. 62/298,056 filed Feb. 22, 2016, entitled, "ROM ENHANCEMENT THROUGH PM INDICATION", which is incorporated herein by reference in its entirety.

BACKGROUND

This disclosure relates to wireless networking systems and techniques, namely, employing power management (PM) mechanisms in addition to receive operating mode (ROM) indication mechanisms so as to support ROM related outage periods enhancements between wireless devices. The techniques disclosed within this disclosure can also be used in wireless networks using wireless communication technologies mentioned herein.

Wireless communication, particularly wireless local area network (WLAN) technology, has become ubiquitous in the mobile computing environment. Some existing wireless networking standards, for example, WiFi protocol IEEE (Institute of Electrical and Electronics Engineers) 802.11 can be used to provide wireless connectivity between wireless devices. In several instances, it may be necessary for devices communicating via a wireless network to dynamically update, adjust, or otherwise change their operational settings used for enabling the transmission and/or reception of data in wireless communication. ROM indication a management mechanism used in some 802.11 wireless technology standards, for example 802.11ah, in order for a device configured for wireless connectivity to signal a change in its receive (RX) parameters, namely a maximum operating channel width and a maximum number of spatial streams (NSS). According to some 802.11 wireless technology standards, a wireless device, for example a wireless station (STA) can transmit a frame or element, including a ROM indication, notifying other devices in the wireless network of its new ROM settings. Subsequently, it is required for other wireless devices, intending to transmit data for reception by the STA changing its ROM, to delay transmitting data until after expiration of an outage period needed for the STA to adopt the most recent operating mode configuration. However, it can be difficult to define a specified outage period to be globally applied to ROM indication mechanisms, as the time required to adopt ROM setting can vary based on a number of disparate variables. As an example, the time associated with reconfiguring the maximum number of active receive chains utilized by a device can differ from the time needed to configure the same device for use of a new channel width. In some instances, an outage time is a device specific characteristic that can change based on variables such as manufacturer or wireless antenna implementation.

SUMMARY

This disclosure relates to wireless networking systems and techniques, namely employing power management (PM) indication mechanisms in addition to ROM indication mechanisms so as to support ROM related outage period enhancements between wireless devices. The techniques described within this disclosure can be used in wireless networks that employ device operating mode notification techniques, such as ROM indication, for wireless communication technologies mentioned herein.

According to an aspect of the described systems and techniques, a method includes: transmitting, by a first wireless device, a first data frame, wherein a format of the first data frame includes: (i) a field indicating a change in receive operation mode (ROM) settings, wherein the field includes a first value indicating how many spatial streams (NSS) and a second value indicating a channel width, and (ii) a subfield having a value indicating a power management mode of the wireless device; and receiving, by the first wireless device, an acknowledgement frame to enable a power management mode associated with the subfield in the first frame, the acknowledgement frame having been transmitted by a second wireless device m response to receiving the first frame by the second wireless device, wherein the power management mode delays transmission of additional frames to the first wireless device until receiving a second data frame having a value indicating a change in the power management mode; and transmitting, by the first wireless device, the second data frame upon completing configuration of the first wireless device to enable wireless communication in accordance with the RUM settings associated with the field in the first frame indicating the change in (ROM) settings.

According to an aspect of the described systems and techniques, an apparatus includes: a wireless transceiver; and circuitry coupled with the first transceiver configured to: transmit, by the wireless transceiver, a first data frame, wherein a format of the first data frame includes (i) a field indicating a change in receive operation mode (RUM) settings, wherein the field includes a first value indicating how many spatial streams (NSS) and a second value indicating a channel width, and (ii) a subfield having a value indicating a power management mode of the wireless device; receive, by the wireless transceiver, an acknowledgement frame to enable a power management mode associated with the subfield in the first frame, the acknowledgement frame having been transmitted by a second wireless device in response to receiving the first frame by the second wireless device, wherein the power management mode delays transmission of additional frames to the first wireless device until receiving a second data frame having a value indicating a change in the power management mode; and transmit, by the wireless transceiver, the second data frame upon completing configuration of the first wireless device to enable wireless communication in accordance with the ROM settings associated with the field in the first frame indicating the change in (ROM) settings.

According to an aspect of the described systems and techniques, an system includes: a first wireless device configured to: transmit a first frame indicating a change in receive operation mode (ROM) settings, enable a power management mode, in response to an acknowledgement frame, wherein the power management mode delays transmission of additional frames to the first wireless device until receiving a second frame having a value indicating a change in the power management mode, and transmit the second frame upon completing configuration to enable wireless communication in accordance with the ROM settings indicated in the first frame; and a second wireless communication device configured to: transmit the acknowledgement frame in response to the first frame triggering the power management mode at the first wireless device, and transmit additional frames to the first wireless device in response to the second frame indicating a change in the power management mode of the first wireless device.

The described systems and techniques can result in one or more of the following advantages. An appropriate delay of subsequent frames during adoption of new receive mode functionality (conveyed using ROM indication mechanisms) can be supported while maintaining an acceptable latency in transmission of data. Different wireless devices in a wireless network may require varying and distinct periods to adjust for changing ROM settings, thereby affecting the required outage time and causing an outage period that is sufficient for a particular wireless device in the network to be arbitrary for another networked device. The disclosed technologies employ an ROM/PM indication techniques utilizing a frame that is formatted, or otherwise designed, to allow for leveraging power management mechanisms to effectively trigger the start and expiration of a ROM related outage period, precluding the use of an arbitrary outage time period. The ROM/PM indication system and techniques described implement ROM related outage period enhancements that potentially reduce errors in operating mode changes such as: transmitting frames prior to adoption of new ROM settings; an outage period mismatch between wireless devices; an insufficient outage period; or a combination of these. The described systems and techniques employ ROM/PM indication techniques that are more directly tied to the actual completion of adopting new ROM settings, thereby decreasing data reception latency transmission can begin at ROM readiness). The ROM/PM indication techniques described herein employ a data frame format (i.e., utilizing information in the MAC header) that can preclude the need for negotiation mechanisms to determine ROM related outage period(s), or an exchange of management frames to determine ROM related outage period(s), thereby improving MAC efficiency. Moreover, the ROM/PM indication techniques described support dynamic configuration of ROM settings, which allows a wireless device to realize advantages associated with adjusting its receiving mode to achieve higher throughput operation or powering saving operation.

BRIEF DESCRIPTION OF THE DRAWINGS

FIG. 3 shows an example of a process implementing ROM/PM indication techniques.

Like reference symbols in the various drawings indicate like elements.

DETAILED DESCRIPTION

Figure 1:
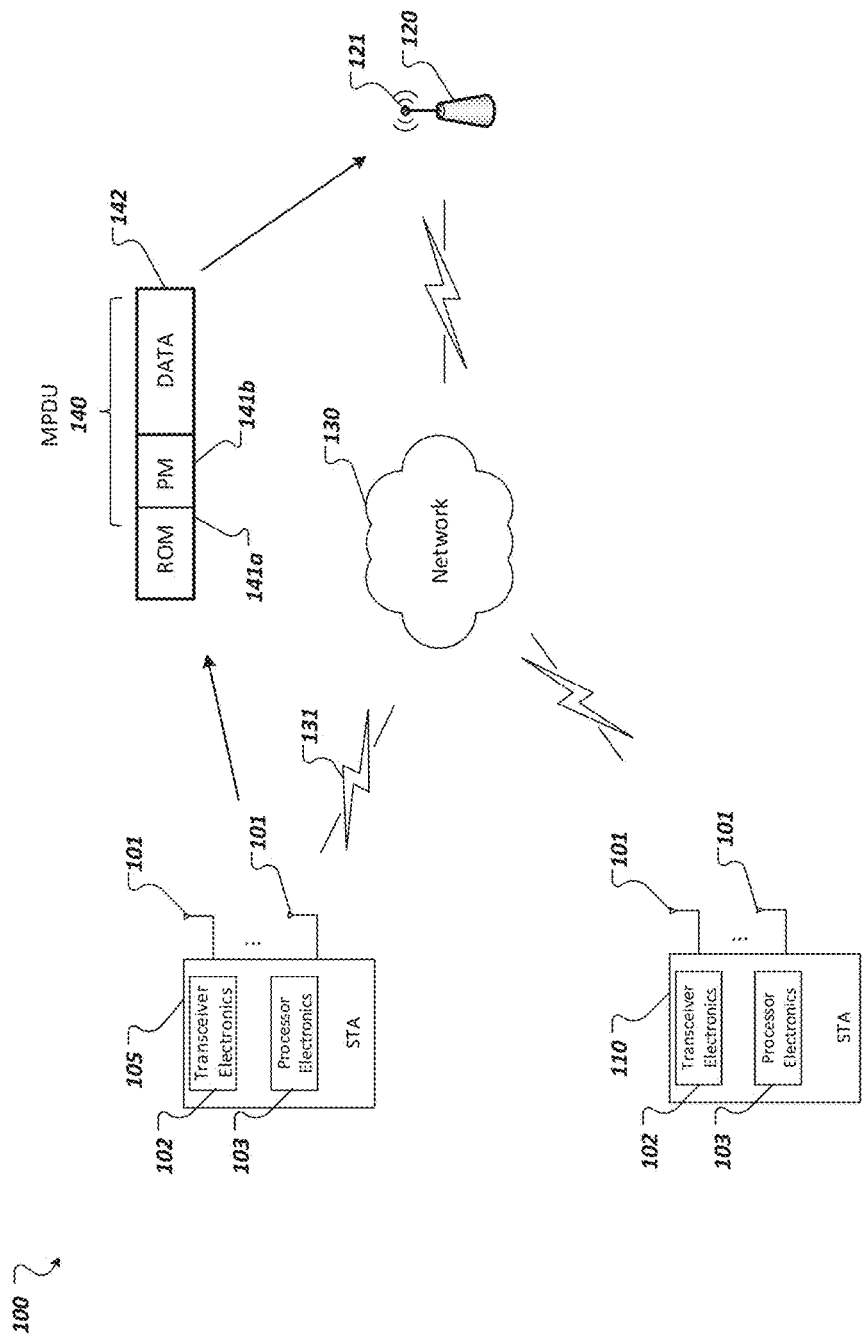
FIG. 1 shows an example of a wireless communication system used for implementing ROM/PM indication techniques.

This disclosure relates to wireless networking systems and techniques, namely employing power management (PM) indication mechanisms in addition to ROM indication mechanisms so as to support ROM related outage period enhancements between wireless devices, such as wireless stations (STAs) and access points (APs). FIG. 1 shows an example of a wireless communication system 100 including wireless network 130. According to the implementations, the wireless network 130 is implemented as a WLAN. As an example, the wireless communication system 100 is implemented as a basic service set (BSS) architecture according to IEEE 802.11 communication standard. The wireless communication system 100 can be employed to provide wireless connectivity for stationary, portable, and mobile devices within accessible range to establish wireless communication links 131, or channels, supported by the wireless network 130. The wireless communication system 100 includes components that interact with one another in order to provide an over-the-air (OTA) interface between STAs 105, 110 and AP 120. The AP 120 can be implemented as a wireless networking device including an antenna 121 to communicate with wireless devices, such as STAs 105, 110 and other components of the wireless network 130.

The STAs 105, 110 can each be a wireless communication device that includes circuitry that can be understood in two main parts: transceiver electronics 102 to send and receive wireless signals over one or more antennas 101; and processor electronics 103 to effect the wireless communications using the transceiver electronics 102. In some implementations, the STAs 105, 110 include dedicated circuitry configurations for transmitting and dedicated circuitry configurations for receiving. In addition, the processor electronics 103 of STAs 105,110 can include one or more processors, such as a digital baseband processor and one or more additional dedicated processing units (e.g., a power management unit and audio codec). As an example, the processor electronics can include a Digital Signal Processor (DSP), a MicroController Unit (MCU), and at least one memory device to hold data and potentially instructions for the MCU. The transceiver electronics 102 of STAs 105, 110 can possess the components, circuitry, and architecture necessary to support various wireless communication functions, for example transmitting and/or receiving information via WiFi networking technology.

AP 120 can be connected to additional network devices, such as routers and modems, for example, operating to further connect wireless devices to a wide area network (WAN), such as the Internet. The AP 120 can be employed to register STAs 105,110, thereby allowing the wireless devices to receive wireless communication services. As shown in FIG. 1, the system 100 includes a set of wireless stations (STAs) 105, 110 that can be controlled by a configuration function that determines when a station can transmit and/or receive information via the network 130. In some implementations, AP 120 implements direct communication between the STAs 105, 110, such as point-to-point communication, where a wireless channel is allocated for the devices to communicate directly. The STAs 105,110 can communicate with one or more other wireless communication devices and/or the AP 120 using one or more antennas 101 and one or more wireless transmission technologies. The wireless technologies employed can include near field communications (NFC), Bluetooth (BT), WiFi, as well as mobile phone technologies, such as WCDMA (Wideband Code Division Multiple Access), CDMA2000, UMTS (Universal Mobile Telecommunications System), GSM (Global System for Mobile communications), High Speed Packet Access (HSPA), and LTE (Long-Term Evolution, often referred to as 4G). In some implementations, the system 100 can also include various other wireless communication components, such as base stations (BS), additional APs, and wireless clients.

Moreover, the wireless communication system 100 can be employed in performing the ROM/PM indication techniques described herein. For instance, a wireless device communicating via the wireless network 130, for instance STAs 105, 110, utilizes ROM/PM indication techniques as a mechanism used in dynamically configuring its ROM settings. FIG. 1 illustrates STA 105 communicating ROM/PM indications 141a,141b, which serves to indicate to other network devices that it is adopting a change in its operating channel width, the maximum number of spatial streams that it can receive, or both, so as to support various wireless networking capabilities.

The wireless devices shown in FIG. 1, STAs 105, 110, are configured to convey ROM/PM indications 141a, 141b in the media access control (MAC) header of a transmitted frame, such as a data/management MAC Protocol Data Unit (MPDU) 140, to be received by the AP 120 (or another STA) as notification of any updates to its existing operation mode for performing various networking functions. As an example, the ROM/PM indication techniques described herein are applicable for indicating a change to the number of active receive chains used in implementing spatial multiplexing functions. According to some existing 802.11 standards, wireless devices are capable of utilizing spatial multiplexing techniques which allow the device to operate using one active receive chain for a significant portion of time, and then reconfigure so as to enable a larger number of receive chains not exceeding all available receive chains, when necessary. Consequently, implementing spatial multiplexing provides the advantage of conserving device power, as a wireless device can operate a lower power RX operating mode for a significant portion of time, and conditionally configure its operation to a higher RX operating mode (e.g., a maximum number of spatial streams) for comparatively shorter instances. In continuing with the example, a transmitted MPDU 140 can be formatted to include a ROM indication 141a having a value RX NSS=2, in the case where the STA 105 is notifying other devices in the wireless network that it is dynamically changing from its lower power ROM setting (e.g., RX NSS=1) and adopting an increased number of spatial streams, so as to implement spatial multiplexing. Additionally, a subfield of MPDU 140 including the ROM indication 141a is formatted to include values related to other ROM settings, such as the maximum operating channel width that indicates the maximum bandwidth (BW) that is supported by the STA for receiving frames. The ROM indication 141a can be used to notify the AP 120 that the transmitting STA 105 is adopting a configuration to support an updated channel width, for instance including a value indicating Channel Width=40 MHz. Although spatial multiplexing is discussed as an example, wireless devices, such as the STAs 105,110, are capable of transmitting MPDU 140 according to the ROM/PM indications techniques described as notification of changes in its existing operating mode for other purposes relating to ROM settings, for example in order to adapt its communication configuration (e.g., channel width), to be optimized for existing link conditions. In accordance with existing 802.11 wireless technology standards, ROM indication 141a is employed to indicate ROM settings for channel width and number of spatial streams. However, in some implementations the ROM indication 1411.a can be potentially formatted for implementing indications of other parameters associated with receiving operating mode as deemed necessary and/or appropriate.

Also, in accordance with the ROM/PM indication techniques described, the transmitted MPDU 140 is further formatted to include ROM/PM indications 141 using power management mechanisms, as defined in some existing 802.11 wireless technology standards. The ROM/PM indication techniques described utilize the illustrated MPDU 140 format implementing both the ROM indication 141a and the PM indication 141b to leverage power management techniques to address the outage period associated with implementing recently sent ROM settings. A ROM related outage period, in accordance with some existing wireless networking technologies, such as 802.11ax, is a time period in which a wireless device responding to a transmitting wireless device that has notified the network of its changed ROM setting, refrains from sending subsequent frames to that transmitting device.

The outage period is intended to allow the wireless device and it components, such as a wireless receiver, ample time to adjust to the new NSS or Channel Width aspects of the ROM settings. In an example implementing the ROM/PM indication techniques described, when the STA 105 communicates MPDU 140 to AP 120 in order to notify its receiving mode change, the MPDU 140 is formatted to include PM indication 141b being set to a value indicating a power save (PS) mode, in addition to the updated ROM setting indicated by ROM indication 141a. Some 802.11 wireless technology standards employ a value of PM=1 to indicate PS mode. In PS mode, in accordance with 802.11 standards, the transmitting STA 105 is considered to be in a doze state, in which the device is not considered to be active, or otherwise powered on to enable receiving frames at any time.

Based on the indicated PS mode, which is signaled using the PM indication 141b, a responding wireless devices does not transmit subsequent frames to the transmitting wireless device until receiving an appropriate frame, from that particular transmitting wireless device, further indicating that the device is currently enabled for receiving additional frames (e.g., PS-Poll frame, MPDU indicating active mode). For instance, after receiving the MPDU 140 including the ROM indication 141a and the PM indication 141b, the AP 120 (or other STAs) refrains from transmitting subsequent PLCP Protocol Data Units (PPDUs) to STA 105 while it is associated with PS mode, thereby creating a power save window, with a communication outage within the window, without requiring that time period associated with PS mode being predefined, uniform, or previously negotiated. Thus, the ROM/PM indications technique effectively implements a ROM related outage period, where a transmitting wireless device is considered by the network to be in a PS mode associated doze state that corresponds to the time used for appropriately adopting changes to its ROM settings. Subsequent to receiving another frame from the transmitting wireless device indicating that the device is no longer in PS mode (discussed in greater detail in reference with FIG. 4), or has completed configuring for its most current settings, a responding device considers the transmitting device as active and thus can proceed to transmit additional frames to be received by the transmitting wireless device using the indicated ROM setting.

FIG. 1 illustrates STA 105 transmitting a data MPDU 140 frame including fields (and subfields) for ROM/PM indications 141a,141b and data 142. Additional detail regarding the format of DATA MPDU 140 used to implement the ROM/PM indication techniques is discussed in reference to FIGS. 2A-2C. For the purposes of illustration, the ROM/PM indications 141a, 141b are shown proximately together, however it should be appreciated that FIG. 1 intends to generally illustrate that the techniques herein are capable of enhancing ROM indication mechanisms by further utilizing power management indications in a shared frame, and not necessarily a frame limited to the fields of the particularly shown format and/or ordering of fields (or subfields).

Figure 2A:
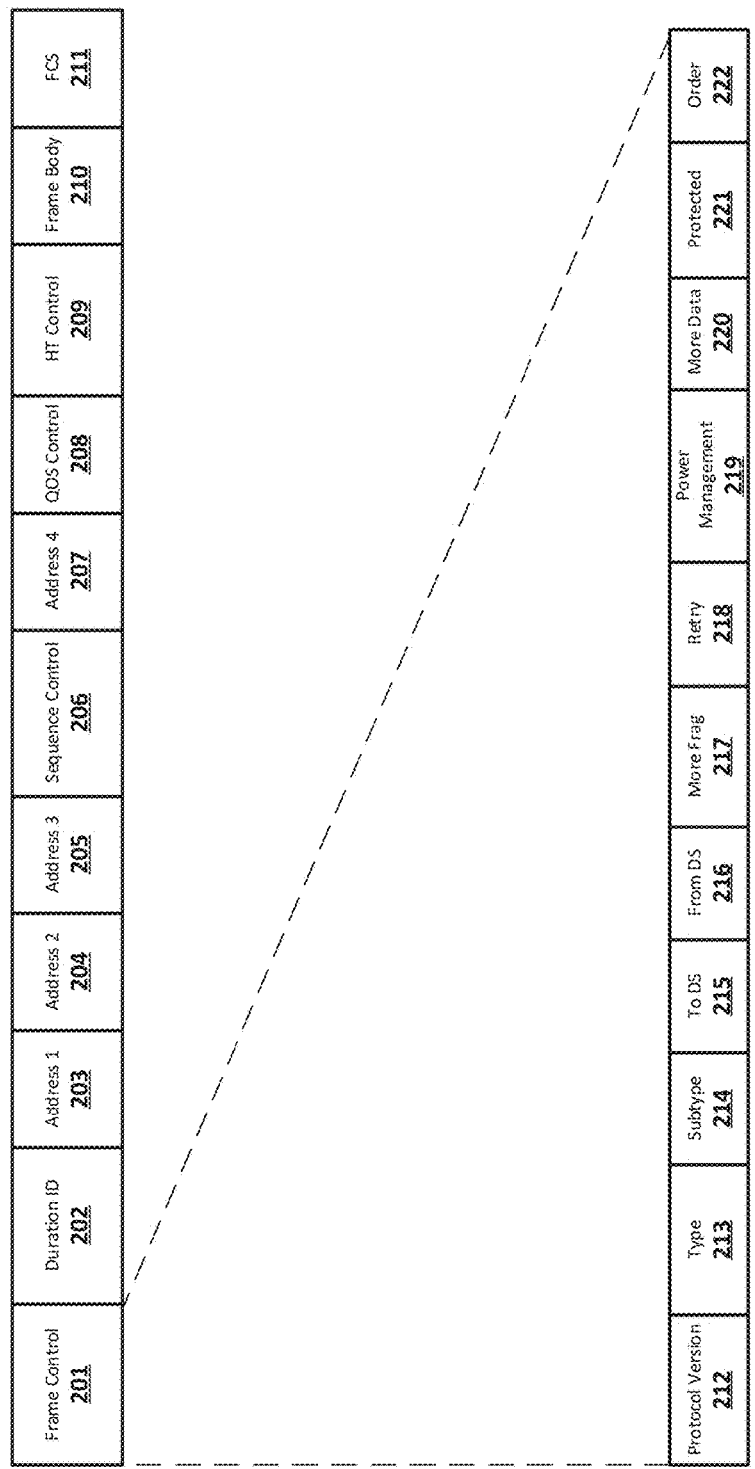
FIG. 2A shows an example of a frame format including a power management subfield for implementing ROM/PM indication techniques.

FIG. 2A shows an example of a frame format including PM 219 subfield for implementing the ROM/PM indication techniques described. According to the techniques described, frame 200 shown in FIG. 2A is implemented as a MPDU frame of type DATA that is formatted, or otherwise designed to allow for implementing at least the power management aspects of the ROM/PM indication techniques, which further support the ROM related outage period enhancements disclosed. That is, the techniques and systems disclosed further leverage PM techniques, using the PM 219 subfield, to implement a ROM related outage period that is not arbitrary and more directly tied to the actual completion of adopting new ROM settings, and thereby potentially improving MAC efficiency. As shown in FIG. 2A, the frame 200 has a format that contains one or more fields including, but not limited to: frame control 201; duration ID 202; address 1 203; address 2 204; address 3 205; sequence control 206; address 4 207; QOS control 208; HT control 209; frame body 210; and frame check sequence (FCS) 211.

Additionally, as shown in FIG. 2A, the frame control 201 field can include multiple subfields that are present in some MPDU frames used in existing 802.11 wireless technology standards. As illustrated, the frame control 201 field can further contain subfields including, but not limited to: protocol version 212 that can be set to a value of "0" for 802.11 standard; type 213 that can be used to indicate whether the frame is a data, management, or control frame; subtype 214 that can be used to identify the frame sub-type; to distribution system (DS) 215 that can be set to indicate that the destination frame is for the DS; from DS 216 that can be set to indicate that the frame is coming from the DS; retry 218 that can be set in the case of a retransmission frame; more fragments (frag) 217 that can be set in instances when the frame is to be followed by other fragment; power management (PM) 219 that can be set to indicate the wireless station is in PS mode; more data 220 that can be set to indicate that the AP has more buffered data for a wireless station in PS mode; and protected 221 that can be set to indicate that the frame body includes data that is protected (e.g., using a Wired Ethernet Privacy (WEP) algorithm, counter mode with cipher-block chaining message authentication code protocol (CCMP), galois/counter protocol (GCMP) etc.); and order 222 that can be set to indicate certain restrictions for transmission.

Similar to PM techniques as defined in accordance with existing 802.11 wireless technology standards, the power management 219 subfield of the frame control 201 field indicates a power management mode of the wireless station, which is either a PS mode or an active mode (e.g., not power saving). For instance, a frame 200 can be communicated by a transmitting STA including a power management 219 subfield implemented using one bit that is set to a value of "1" to indicate that the device is entering into a PS mode, or alternatively set to a value of "0" to indicate that the device is in active mode. However, according to the ROM/PM indication techniques described where a STA transmits a frame 200 including a PM 219 subfield to enhance a ROM change notification, the PM 219 subfield indicates that the STA is entering into a PS mode (PM=1). Thus, the PM 219 subfield used in the disclosed techniques is associated with the device implementing its RX mode change, rather than the device entering into a low-power doze state as in some existing wireless technology standards. Therefore, PM 219 subfield is utilized, in conjunction with ROM notification, to implement the corresponding enhanced ROM related outage period aspects. Furthermore, once the transmitting STA finishes its RX mode change to support the most recent ROM settings, the STA can transmit another frame 200 using the PM 219 subfield indicating active mode (PM=0), or otherwise transitioning from PS mode, to signify the end of the ROM related outage period and notify responding devices that it can receive additional frames using the new ROM settings.

Figure 2B:
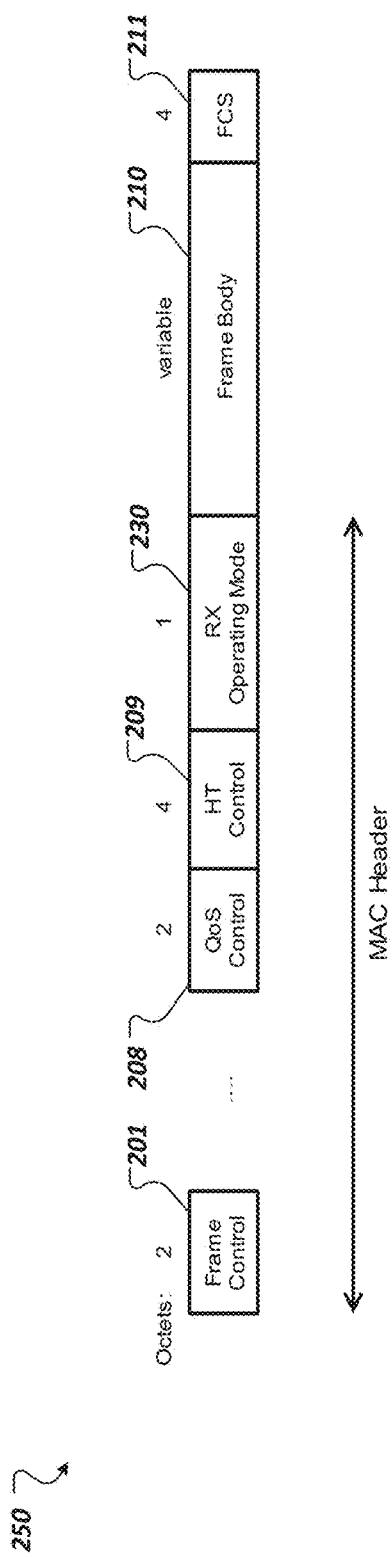
FIGS. 2B-2C show examples of a frame format including ROM subfield for implementing ROM/PM indication techniques.

FIG. 2B shows an example of a frame format including RUM subfield 230 for implementing the ROM/PM indication techniques described. According to the techniques described, frame 250 shown in FIG. 2B is implemented as a DATA MPDU frame or MANAGEMENT MPDU frame that is formatted, or otherwise designed to allow for implementing at least the ROM notification aspects of the ROM/PM indication techniques. As illustrated, the format of a frame 250 includes one or more fields, including but not limited to: frame control 201; QoS control 208; high throughout (HT) control 209; frame body 210; and FCS 211. Moreover, the format of frame 250 is illustrated as including RUM 230 subfield located in the MAC header portion of frame 250. In some instances, dedicated bits of the ROM 230 subfield are used to indicate the RX NSS parameter of the ROM settings, denoting the maximum number of receive spatial streams of the receiver. Additionally, other dedicated bits of the ROM 230 field can be used to indicate the RX Channel Width (e.g., 3 bits) parameter of the RUM settings, denoting the maximum operating channel width of the receiver. In some implementations, the HT Control 209 field includes an HE variant HT Control field. For example, bits B0 and B1 of the HE Variant HT Control field being set to a value "11" indicates the presence of the ROM 230 subfield. Furthermore, bits B2 to B31 of the HE variant HT Control Field can include one, or multiple, 4-bit Control ID and Variable control subfields, in which bits of the Control ID are used to implement the ROM 230 subfield. The 4-bit Control ID field, in bits B2 to B5 of HT Control Field, in addition to bits B6 to B17 of HT Control Field can be used to define the ROM. In another implementation, the ROM 230 subfield can be included in an HE variant HE Control field.

Figure 2C:
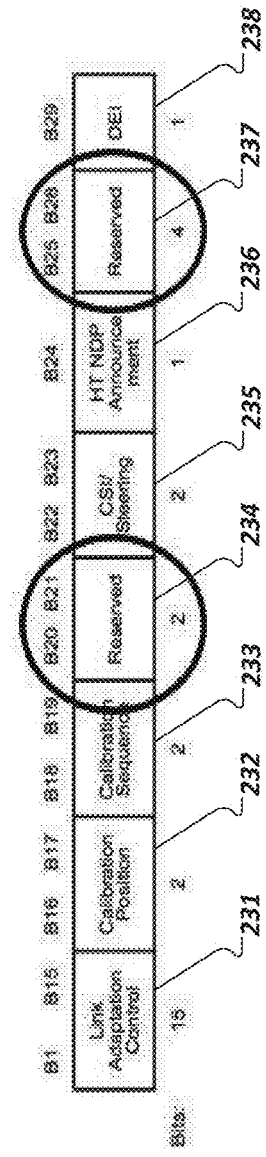

According to other implementations, FIG. 2C illustrates another example of a frame format implementing ROM indication techniques by using reserved bits in either the HT variant control field (shown in FIG. 2C). As illustrated in FIG. 2C, two reserved bits (i.e., B20-B21) and 4 reserved bits (i.e., B25-B28) in the HT control middle subfield of the HT variant HT control field can be used for implementing ROM indications. Additionally, FIG. 2C shows the HT variant HT control having a format containing one or more subfields including, but limited to: link adaptation control 231; calibration position 232; calibration sequence 233; reserved 234; CSI/steering 235; HT NDP Announcement 236; reserved 237; DEI 238.

FIG. 3 shows an example of a process 300 implementing the described ROM/PM indication techniques. For purposes of illustration, the process 300 is shown as operations of a communication process implementing the described ROM/PM indication technique as performed at the respective wireless devices, for instance an STA and an AP. In some instances, the communication process is capable of being performed directly between STAs. The process 300 includes operations for a wireless device, the STA, to change its operating mode setting, and communicate a ROM indication notifying another wireless device, such as an AP, of the update to the most recent settings. The process 300 begins at 305, with a wireless device communicating via a wireless network, namely a STA, transmitting a frame notifying that the device is starting the process of changing its operating mode setting. According to the described techniques, the STA is configured to indicate its new ROM settings using a frame formatted to include both a ROM indication and a PM indication. The ROM indication is signaled using a ROM subfield in the MAC header of a DATA frame (e.g., ROM subfield located in the HE variant HT Control field), as discussed in detail in reference to FIGS. 2B-2C. For example, the ROM subfield in the transmitted frame is set to indicate that the STA is changing its maximum operating RX Channel Width, its RX NSS, or both. Additionally, the transmitted frame is formatted to include a PM indication in a power management subfield in the MAC header of the frame. For instance, the PM indication in the PM subfield of the frame is set to a value of "1", signaling that the STA is enabling aspects of a PS mode.

In some cases, the transmitted frame is implemented as a MPDU. In the process 300, the STA transmits a frame notifying its ROM setting change to an AP. However, it should be appreciated that the ROM/PM indication techniques described are capable of being supported between multiple STAB. For instance, the STA can transmit the frame notifying its ROM setting change to another STA within the wireless network.

At 310, which is shown in the section of the example process 300 performed at the AP, the AP receives the frame transmitted from the STA for notification of its ROM setting change. In accordance with the ROM/PM indication techniques described, the frame received at the AP includes the ROM/PM indication.

At 315, the AP transmits an acknowledgement frame (ACK) in response to successfully receiving the frame including the ROM/PM indication from the STA. Based on the ROM indication received in the frame, the AP is notified of the most recent ROM settings that are supported by the STA for receiving frames.

At 320, the AP performs a check to determine whether PS mode is being indicated by the PM indication of the received frame. For example, the PM indication included in the frame being set to "1" signals that the STA is on PS mode. In response to the PS mode indication (i.e., Yes), the AP waits at 325, and delays transmission of additional frames to the STA.

At 330, the STA receives the ACK frame transmitted from the AP. Thereafter, the STA starts a configuration, or re-configuration, procedure to adopt the updated ROM settings upon receiving the ACK from the AP. In some instances, the STA initiates its adjustment to the most recently conveyed ROM settings immediately following the successful receipt of the ACK frame from the responding AP. For example, the STA can adopt a power saving configuration, by changing to a ROM setting that consumes less power. Consequently, the STA adjusts to the use of the updated ROM settings, as indicated by the ROM indication, while the AP continues to wait at 325 in association with PS mode. At 335, the STA determines whether its configuration for the receive mode change is complete.

In the instances where the receive mode change is not complete (i.e., No), the STA continues to perform the operations necessary to adopt the new ROM settings. In the example illustrated in FIG. 3, the process 300 is shown as iteratively performing check 335 at the STA to determine whether its ROM change its complete. In some cases, the check at 335 is performed one or more times, by the STA, until the new ROM settings are determined to be adopted. However, other implementations capable of determining a complete ROM setting change can be used as deemed necessary or appropriate. For instance, a specified ROM wait period associated with the STA can be used, where the process proceeds to 345 to notify the network whether it has finished its new ROM setting configuration, upon expiration of the wait period. Furthermore, the AP, while waiting at 325, refrains from transmitting frames to the STA during the PS mode and as the STA is implementing its new functionality (during operations 335 and 340). In some instances, completing the adoption of changed ROM settings involves configuring any suitable device circuitry (e.g., transceiver electronics, processor electronics, and the like) of the STA to support the changed. NSS, Channel Width, or other indicated ROM parameters, as deemed necessary or appropriate. Thus, determining the RUM change completion can include monitoring STA circuitry for its ability to operate at the values indicated in the ROM subfield, for example. After it has been determined, at 335, that the STA has finished adopting the most recent ROM settings (i.e., Yes), the process proceeds to 345. Upon completing its adoption of the new ROM settings, the STA is capable of receiving frames using the RX NSS and RX Channel Width as defined in the values of the ROM indication.

At 345, the STA transmits a second DATA or MANAGEMENT frame to the AP notifying its completion of the ROM settings change. For example, once the STA finishes its ROM settings change, the STA transmits a frame with the PM indication set to a value of "0", indicating that the power management mode has changed from PS to AM. Thus, according to the techniques described, a ROM related outage period is implemented, allowing the STA to complete the process of changing its operating mode setting, by leveraging the PS mode aspects of power management. That is, in general, the ROM/PM mode indication techniques described implement a ROM related outage period that corresponds to enabling the PS mode (and subsequent PS mode disabling), rather than an arbitrary, predefined, or negotiated outage time period.

Upon receiving a second DATA frame, the AP can subsequently perform the check at 320. At 320, the PM indication of the received frame can be used to determine whether the STA is continuing to be associated with PS mode, or conversely, is changing to AM. In the case where the PM indication is set to "0" within the frame received at the AP, it signals the change from PS mode (i.e., No) to the STA being considered active, and further indicating the expiration of the ROM related outage period. Therefore, the check at 320 serves as an indication that the AP has waited long enough to compensate for the readiness of the STA to utilize the new ROM settings (i.e., STA finished its receive mode change), in the case where the PS mode is still enabled (i.e., Yes), the AP continues to wait, at 325, and then check, at 320, for a frame with an indication that the PS mode is disabled. In some implementations, operations 320 and 325 are iteratively looped until the AP has successfully received at least one frame notifying the AP that the STA has completed its change to the new operating mode. In some implementations, the AP waits at 325 for a set period of time, and thereafter performs other iterations of the check, at 320, to determine whether the PS mode has been disabled (i.e., STA in AM). Note that the AP and/or the STA can engage in other activities during the wait 325. For example, in the case of a transmission failure, or the AP failing to receive the second frame (and subsequently sending an ACK to the STA), the STA can be configured to attempt a recovery procedure such as retrying transmission or otherwise re-transmit the frame. In some implementations, a time duration or a threshold number can be used to limit retransmission attempts made by the STA. As an example, an STA can retransmit based on a retry counter, and will not retry transmission of a data frame if the counter exceeds a maximum threshold. Thus, the techniques can address transmission errors that can be experienced in the wireless network from various sources (e.g., collision, bit error, etc.). Alternatively, the STA can defer from changing the new ROM settings until a successful acknowledgement of is received from the AP.

Once it has been determined that the PS mode is indicated as disabled (i.e., No) at 320, signaled by indicating a change to AM in the PM indication of the second frame, the frame serves as an indication to the AP that the STA is capable of receiving additional frames in accordance with the new ROM settings. Thereafter, at 350, the AP can start to additionally transmit other frames to be received by the STA using the ROM settings successfully adopted by the STA. In some cases, the additional frames subsequently transmitted to the STA, at 350, are implemented as PPDU frames. Thus, the AP does not transmit additional frames to be received by the STA's transceiver until after the PS mode is disable, indicating that the ROM related outage period has been trigged as expired.

Figure 4:
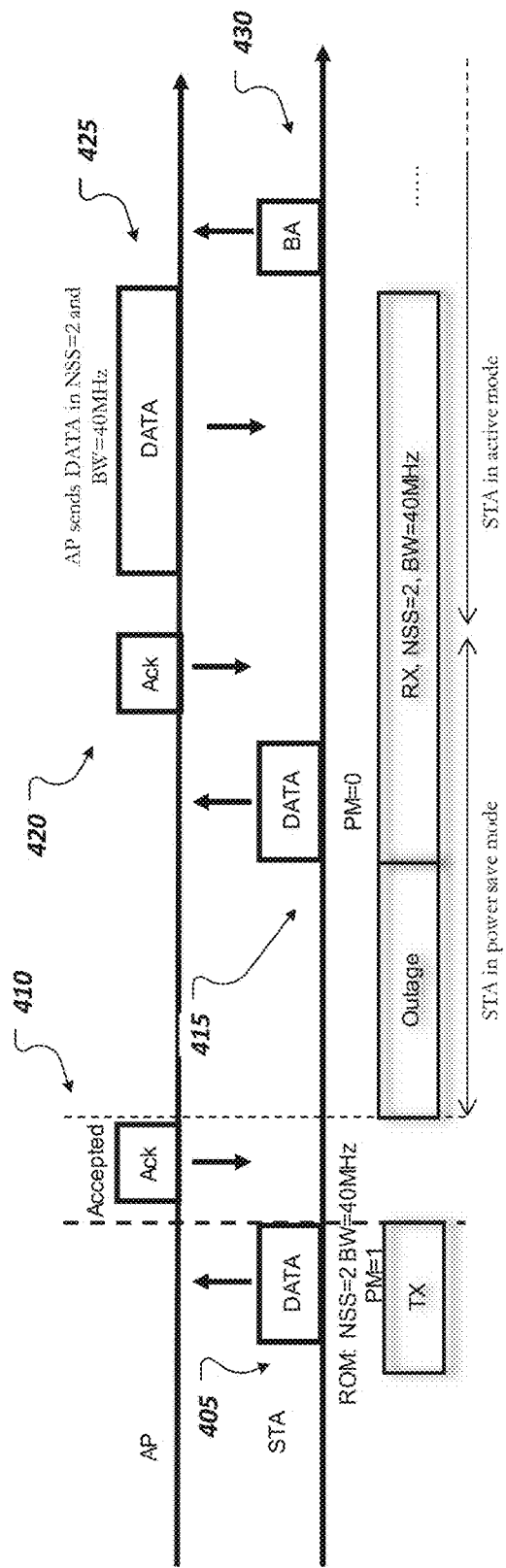
FIG. 4 shows a message flow diagram for an example of a process implementing ROM/PM indication techniques.

FIG. 4 shows a message flow diagram for another example of a process implementing ROM/PM indication techniques. As shown in the message flow operation 405, the STA transmits a frame of type DATA or MANAGEMENT with both a ROM indication and PM indication subfields in the MAC header, as described in greater detail in reference to FIGS. 2A-2C. In some implementations, the DATA or MANAGEMENT frame is transmitted as an individually addressed MPDU frame. As illustrated, the ROM indication is set to include the ROM setting value of "2" (NSS=2) indicating the maximum number of spatial streams and the ROM setting value of "40 MHz" (BW=40 MHz) indicating the maximum operating channel width. In some cases, ROM indications are set to indicate that the STA supports receiving frames with a bandwidth up to and including values varying from 20 MHz-160 MHz, for example, as indicated by the Channel Width ROM setting value. In some cases, ROM indications are set to indicate that the STA supports receiving frames with a number of spatial streams up to and including values varying from 2-8, for example, as indicated by the NSS ROM setting value. Moreover, the frame transmitted in message flow operation 405 can include the PM indication set to a value of "1" indicating PS mode.

Next, during message flow operation 410, an ACK frame can be sent by the AP side, in response to the DATA frame or MANAGEMENT transmitted from the STA notifying the AP of the change in ROM settings being accepted, or successfully received. Moreover, upon receiving the ACK frame at the STA side, the ROM related outage period triggered by the PS mode indication, is initiated so as to allow for the STA to adopt the most recent communicated RUM settings indicated in the ROM indication of the eliciting frame. In some implementations, the ROM related outage period can be triggered by the ROM indication conveyed according to the ROM/PM indication techniques. Thus, a specified ROM wait period associated with the STA can be used, where the STA waits for the expiration of the time period to then notify the network whether it has finished adopting the new ROM settings.

Thereafter, during message flow operation 415, a subsequent DATA or MANAGEMENT frame is transmitted from the STA. As illustrated, the PM indication included in the set to a value of "0" indicating AM, or otherwise disabling PS mode. According to the techniques described, the STA transmits the subsequent DATA or MANAGEMENT frame as notification that it has completely adopted the updated ROM settings, and that the STA is currently configured to receive frames using the values set in the ROM indication, namely. NSS=2 and BW=410 MHz. Moreover, the DATA or MANAGEMENT frame serves to trigger an expiration to the ROM related outage period. For instance, in the case where a specified ROM related outage period is employed, the AP will continue to postpone transmission of the additional frames even after the specified window has expired. After a specified ROM related outage period automatically expires at the AP, the AP will wait until it receives the DATA or MANAGEMENT frame at flow operation 415, thereby preventing transmission to the STA prior to it completely adjusting to the new ROM settings. In message flow operation 420, the AP transmits an ACK frame in response to successfully receiving the subsequent DATA or MANAGEMENT frame indicating the change to AM in the PM indication.

Now that the STA is capable of receiving data/management/control frames in accordance with the changed ROM settings, message flow operation 425 includes the AP side transmitting a DATA or MANAGEMENT frame using the values indicated by the Channel Width and the NSS of the most recently received RUM settings indicated as supported by the STA. In some implementations, the DATA or MANAGEMENT frame is implemented as PPDU. For instance, the AP transmits the PPDU using a number of spatial streams up to and including 2, and at a bandwidth up to and including 40 MHz.

Lastly, message flow operation 430 includes the STA transmitting a block acknowledgement (BA) to the AP in response to receiving additional frames, namely PPDU, from the AP. In some cases, multiple PPDUs received by the STA can be acknowledged together using a single BA frame. The ROM/PM indication techniques described herein leverage power management aspects to implement a ROM related outage period that is triggered by PS mode and increasingly tied to actual completion of adopting new ROM settings, illustrated by the message flow operation 415. Consequently, the techniques disclosed realize a solution for reducing the potential of transmitting subsequent PPDU to be received by the STA prior to its ROM readiness.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any, form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
   transmitting, by a first wireless device, a first data frame to a second wireless device, wherein a format of the first data frame comprises
   (i) a field indicating a change in current receive operation mode settings to updated receive operation mode settings, wherein the field includes a first value indicating a number of spatial streams and a second value indicating a channel width, and
   (ii) a subfield having a value indicating a power management mode of the first wireless device, wherein the power management mode is a power save mode, and wherein the first data frame is transmitted while enabling the power save mode or while in the power save mode;
   receiving, by the first wireless device, an acknowledgement frame to enable the power management mode indicated by the subfield in the first data frame, the acknowledgement frame is received from the second wireless device based on transmission of the first data frame to the second wireless device,
   wherein, while in the power management mode, reception of additional data frames from the second wireless device is delayed until transmission of a second data frame by the first wireless device, wherein the second data frame includes a value indicating a change in the power management mode;
   transmitting, by the first wireless device, the second data frame upon completing configuration of the first wireless device to enable wireless communication in accordance with the updated receive operation mode settings; and
   receiving the additional data frames from the second wireless device based on transmission of the second data frame.

2. The method of claim 1, wherein the value of the second data frame indicates the power management mode is changed to an active mode.

3. The method of claim 2, wherein the additional data frames are received by the first wireless device in accordance with the updated receive operation mode settings indicated by the field in the first data frame.

4. The method of claim 3, wherein the additional data frames are transmitted in response to determining that the power management mode is changed to the active mode based on the second data frame.

5. The method of claim 3, wherein receiving the additional data frames comprises receiving the additional data frames with (i) a number of spatial streams up to and including the first value, and (ii) a bandwidth up to and including the second value.

6. The method of claim 1, wherein the first data frame is transmitted while enabling the power save mode.

7. The method of claim 1, wherein the first data frame is transmitted while in the power save mode.

8. An apparatus of a first wireless device, the apparatus comprising:
   a wireless transceiver; and
   circuitry coupled with the transceiver and configured to
      transmit, by the wireless transceiver, a first data frame from the first wireless device to a second wireless device, wherein a format of the first data frame comprises
         (i) a field indicating a change in current receive operation mode settings to updated receive operation mode settings, wherein the field includes a first value indicating a number of spatial streams and a second value indicating a channel width, and
         (ii) a subfield having a value indicating a power management mode of the first wireless device, wherein the power management mode is a power save mode, and wherein the first data frame is transmitted while enabling the power save mode or while in the power save mode;
      receive, by the wireless transceiver, an acknowledgement frame to enable the power management mode associated with the subfield in the first data frame, wherein the acknowledgement frame is received by the first wireless device from the second wireless device based on transmission of the first data frame to the second wireless device, and wherein, while in the power management mode, reception of additional data frames from the second wireless device is delayed until transmission of a second data frame by the first wireless device to the second wireless device, and wherein the second data frame has a value indicating a change in the power management mode; and transmit, by the wireless transceiver, the second data frame upon completing configuration of the first wireless device to enable wireless communication in accordance with the updated receive operation mode settings.

9. The apparatus of claim 8, wherein the value of the second data frame indicates that the power management mode is changed to an active mode.

10. The apparatus of claim 9, wherein the circuitry coupled with the wireless transceiver is configured to receive the additional data frames in accordance with the updated receive operation mode settings indicated by the field in the first data frame.

11. The apparatus of claim 10, wherein the additional data frames are received from the second wireless device based on the second data frame indicating the power management mode is changed to the active mode.

12. The apparatus of claim 10, wherein the circuitry coupled with the wireless transceiver is configured to receive the additional data frames with (i) a number of spatial streams up to and including the first value, and (ii) a bandwidth up to and including the second value.

13. A system comprising:
a first wireless device configured to:
transmit a first frame indicating a change in receive operation mode settings,
enable a power management mode, in response to an acknowledgement frame, wherein the power management mode delays transmission of additional frames to the first wireless device until receiving a second frame having a value indicating a change in the power management mode, and
transmit the second frame upon completing configuration to enable wireless communication in accordance with receive operation mode settings indicated in the first frame; and
a second wireless communication device configured to
transmit the acknowledgement frame in response to the first frame triggering the power management mode at the first wireless device, and
transmit additional frames to the first wireless device in response to the second frame indicating a change in the power management mode of the first wireless device.

14. The system of claim 13, wherein a format of the first data-frame comprises:
(i) a field indicating a change in the receive operation mode settings, wherein the field includes a first value indicating a number of spatial streams and a second value indicating a channel width; and
(ii) a subfield having a second value indicating the power management mode of the first wireless device.

15. The system of claim 13, wherein the additional frames are transmitted in accordance with the receive operation mode settings indicated in the first frame.

16. The system of claim 13, wherein a format of the second frame includes a value indicating that the power management mode is changed to an active mode.

* * * * *